April 11, 1939.  A. B. POOLE  2,153,775
SELF-STARTING SYNCHRONOUS ELECTRIC MOTOR
Filed March 13, 1936
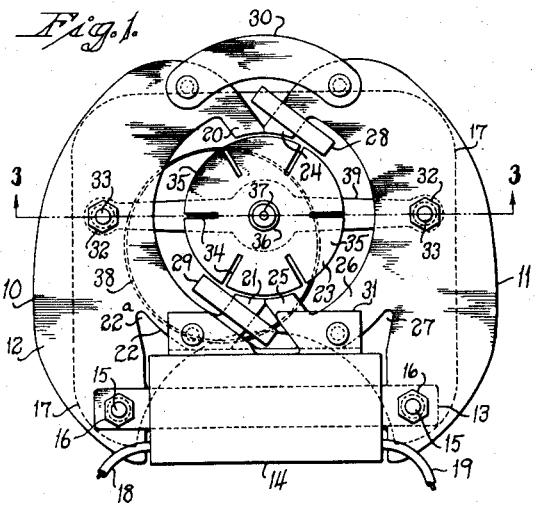
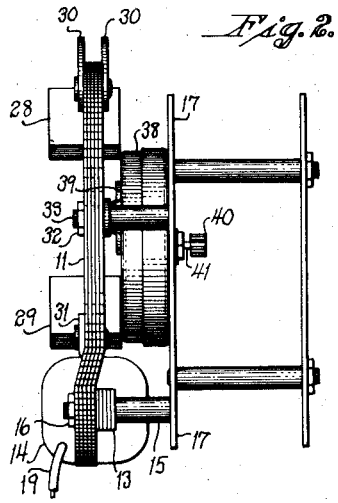
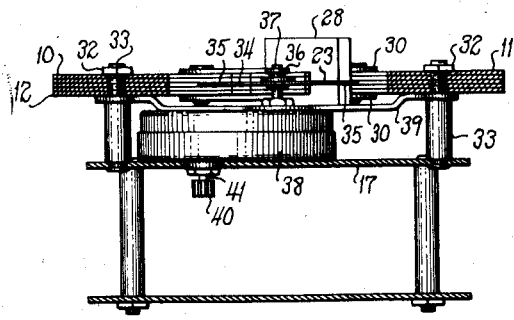
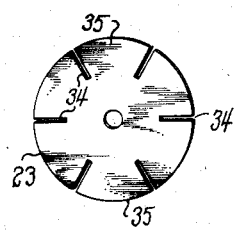
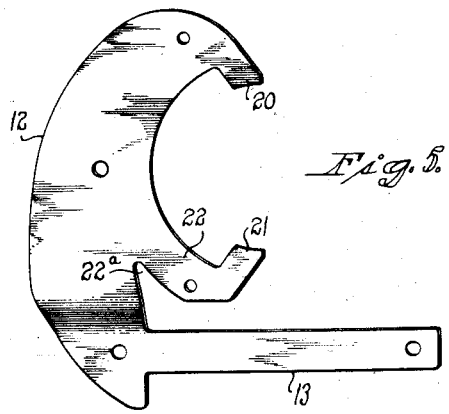
Inventor
Arthur B. Poole
By
Seymour Earle & Nichols
Attorneys Patented Apr. 11, 1939

2,153,775

UNITED STATES PATENT OFFICE 2,153,775

SELF-STARTING SYNCHRONOUS ELECTRIC MOTOR

Arthur B. Poole, Bristol, Conn., assignor to The E. Ingraham Company, Bristol, Conn., a corporation of Connecticut Application March 13, 1936, Serial No. 68,674

5 Claims. (Cl. 172—278)

This invention relates to an improvement in synchronous motors, and particularly to that type of synchronous motors which are self-starting and which are primarily designed for use in clocks, though available for other uses.

One of the objects of the present invention is to provide a superior self-starting synchronous electric motor characterized by minimum hum or other noise attributable to the movement of the rotor.

A still further object is to provide a superior self-starting synchronous motor having ample synchronous torque as well as starting torque, and characterized by the low mass of its rotor.

A further object is to provide a synchronous motor of the class referred to, in which side-pull upon the rotor axis is minimized.

With the above and other objects in view, as will appear to those skilled in the art from the following, considered in conjunction with the accompanying drawing and appended claims, the present invention includes all features disclosed therein which are novel over the prior art.

In the accompanying drawing:

Fig. 1 is a view in rear elevation of a self-starting synchronous electric motor constructed in accordance with the present invention;

Fig. 2 is an edge view thereof;

Fig. 3 is a transverse sectional view taken on the line 3—3 of Fig. 1;

Fig. 4 is a perspective view of the rotor detached; and

Fig. 5 is a perspective view of one of the pole-piece plates detached.

The synchronous electric motor herein chosen for the illustration of the present invention includes two complementary laminated pole-pieces 10 and 11, each of which is composed of a plurality (five, more or less) of corresponding pole-piece plates 12 composed of iron, soft steel or other suitable material. Each pole-piece plate 12 just referred to is laterally offset at its lower end and is provided with an integral core-tang 13 as especially well shown in Fig. 5.

Each pole-pece 10 and 11 as thus composed of a group of corresponding pole-piece plates 12 is arranged in opposition so that the core-tangs 13 of each thereof extend in opposite directions through an energizing-coil 14. The free end of each of the said core-tangs is secured to the opposed pole-piece by the threaded rear ends of studs 15 having nuts 16 and each offsetting from a rear movement-plate 17. The energizing-coil 14 is provided with complementary leads 18 and 19 which may be connected to a suitable source of alternating current of commercial frequency.

The pole-piece 10 is provided at its upper end with an inwardly-extending polar-projection 20 and is provided adjacent its inner end and hence adjacent the energizing-coil 14 with a polar-projection 21. The polar-projection 21 constitutes an inturned extension of an arm 22 extending inwardly from the pole-piece 10 in a direction substantially concentrically with respect to a rotor 23. As will be seen by reference to Figs. 1 and 5 in particular the arm 22 of the pole-piece 10 is formed by notching the said pole-piece as at 22a to thereby cause the flux-path to the polar-projection 21 to have substantially the same reluctance as the flux-path to the polar-projection 20 before referred to.

Similarly, the pole-piece 11 is provided at its outer end with an inwardly-extending polar-projection 24 which is located substantially diametrically opposite the lower polar-projection 21 of the pole-piece 10. Diametrically opposite the polar-projection 20 of the pole-piece 10 the pole-piece 11 is formed with a polar-projection 25 formed at the inner end of an arm 26, which latter is created by suitably notching as at 27 the pole-piece 11.

Preferably and as shown, the polar-projection 20 of the pole-piece 10 and the polar-projection 24 of the pole-piece 11 are in contact or substantial contact and the latter polar-projection is encircled by a so-called "shading-coil" 28 which together with a similar shading-coil 29 upon the polar-projection 21 of the pole-piece 10 serves to create a rotating-field effect. Similarly, the polar-projection 21 of the pole-piece 10 and the polar-projection 25 of the pole-piece 11 are in contact or substantial contact as shown particularly well in Fig. 1.

For the purpose of stabilizing the pole-pieces 10 and 11 with respect to each other and to prevent their vibrating under the influence of the alternating flux supplied by the energizing-coil 14, the outer ends of each of the said pole-pieces are secured together by a pair of complementary tie-plates 30—30 which are preferably formed of brass or other non-magnetic material. For a similar purpose, the arms 22 and 26 of the respective pole-pieces 10 and 11 are rigidly connected together by a tie-plate 31.

As before described, the lower portions of the pole-pieces 10 and 11 are supported by the rear movement-plate 17 by means of studs 15 and in a similar manner transversely in line with the axis of the rotor 23 the said pole-pieces are secured by nuts 32 to the rear ends of studs 33—33 offsetting from the rear movement-plate 17 before referred to.

The rotor 23 is formed of relatively-thin transversely-flexible permanent-magnet material and is provided at intervals with radial slots 34 providing a plurality of flexible salient poles 35. Preferably, the said rotor is of a thickness not less than .003 inch and not more than .010 inch though it has been found for the structure shown .006 inch is most satisfactory. Furthermore, it has been found that the rotor performs its function most satisfactorily with a carbon-content ranging from .9% to 1.1%.

As thus constructed, the rotor 23 is not only permanently magnetic but each of its salient poles 35 is transversely flexible, whereby it operates in the field created by the pole-pieces 10 and 11 with reliable, synchronous and self-starting characteristics.

The rotor 23 is provided with a central bushing 36 which is mounted with a drive-fit upon the forward end of a shaft 37 extending forwardly from a gear-case 38. The said gear-case rests against the rear face of the rear movement-plate 17 before referred to and is held in such position by means of a retaining-yoke 39 mounted at its respective opposite ends upon the studs 32—33. The gear-case 38 may contain a suitable reduction gearing (not shown) serving to transpose the relatively-rapid speed of the rotor 23 into the relatively-slow motion of a drive-pinion 40 mounted upon a drive-shaft 41 rearwardly extending from the said gear-case as shown particularly well in Figs. 2 and 3.

As is well known to designers of miniature self-starting synchronous electric motors, one of the most difficult problems to overcome in order to produce such motors upon a production basis is the problem of balancing the synchronous torque with respect to the lock-in tendency of the torque. Thus, if the lock-in tendency of the rotor is too strong, it will serve to prevent or retard the self-starting of the motor. On the other hand, if the self-starting torque is not properly related to the synchronous or lock-in torque, the rotor will have a tendency to assume speeds above its intended synchronous speed.

By means of the present invention the amount of flux reaching the polar-projections adjacent the energizing-coil 14 is rendered substantially the same as the flux reaching the remote polar-projections, so that the reliable functioning of the motor is assured without undue side-pull upon the rotor and its shaft to the detriment of the bearings. It has been found, furthermore, that the transversely-flexible character of the rotor materially assists in preventing the lock-in tendency of the rotor from nullifying the self-starting torque afforded by the stator structure. All of the features cooperate in providing a self-starting synchronous electric motor which is simple, reliable and effective and which may be produced by mass-production methods.

The invention may be carried out in other specific ways than that herein set forth without departing from the spirit and essential characteristics of the invention, and the present embodiment is therefore to be considered in all respects as illustrative and not restrictive, and all changes coming within the meaning and equivalency range of the appended claims are intended to be embraced therein.

I claim:

1. A self-starting synchronous electric motor, including in combination: a rotor having a plurality of salient poles, each of which is less than 0.010 inch thick and transversely flexible independently of the others; an energizing-coil; a pair of complementary pole-pieces respectively extending from the opposite ends of the said coil, each of the said pole-pieces being provided with a pair of polar-projections extending toward the said rotor, one polar-projection of a given pole-piece being located adjacent the said coil, and the other polar-projection being located remotely therefrom and substantially diametrically opposite one of the polar-projections of the other pole-piece; one polar-projection of each of the said pole-pieces being shaded and located in substantial contact with the unshaded polar-projection of the other pole-piece.

2. A self-starting synchronous electric motor, including in combination: a rotor having a plurality of salient poles, each of which is less than 0.010 inch thick and transversely flexible independently of the others; an energizing-coil; a pair of complementary pole-pieces respectively extending from the opposite ends of said coil, each of the said pole-pieces being provided with a pair of polar-projections extending toward the said rotor, one polar-projection of a given pole-piece being located adjacent the said coil, and the other polar-projection being located remotely therefrom and substantially diametrically opposite one of the polar-projections of the other pole-piece; one polar-projection of each of the said pole-pieces being shaded and located in substantial contact with the unshaded polar-projection of the other pole-piece; and each of the aforesaid complementary pole-pieces being shaped and proportioned to feed to its remote polar-projection flux of substantially the same density as is fed to its polar-projection which is adjacent the aforesaid energizing-coil.

3. A self-starting synchronous electric motor, including in combination: a field-structure having an energizing-coil and polar-projections; and a rotor of permanent-magnet material positioned to be acted upon by the polar-projections of the said field-structure, and having a plurality of independently laterally-flexible salient poles of a thickness of less than 0.010 inch and spaced apart by slots which intersect the periphery of the rotor.

4. A self-starting synchronous electric motor, including in combination: a field-structure having an energizing-coil and polar-projections; and a rotor of permanent-magnet material positioned to be acted upon by the polar-projections of the said field-structure, and having a plurality of independently laterally-flexible salient poles of a thickness not more than 0.008 inch and not less than 0.003 inch and spaced apart by slots which intersect the periphery of the rotor.

5. A self-starting synchronous electric motor, including in combination: a field-structure having an energizing-coil and polar-projections; and a rotor of permanent-magnet material and positioned to be acted upon by the polar-projections of the said field-structure, and having a plurality of independently laterally-flexible salient poles of a thickness not more than 0.007 inch and not less than 0.005 inch and spaced apart by slots which intersect the periphery of the rotor.

ARTHUR B. POOLE.